(12) United States Patent
Behjat

(10) Patent No.: US 10,007,906 B2
(45) Date of Patent: Jun. 26, 2018

(54) USING A MOBILE DEVICE IN A COMMERCIAL TRANSACTION

(76) Inventor: Abdolreza Behjat, Marlborough, MA (US)

( * ) Notice: Subject to any disclaimer, the term of this patent is extended or adjusted under 35 U.S.C. 154(b) by 596 days.

(21) Appl. No.: 13/416,397

(22) Filed: Mar. 9, 2012

(65) Prior Publication Data

US 2013/0126607 A1    May 23, 2013

Related U.S. Application Data

(60) Provisional application No. 61/560,996, filed on Nov. 17, 2011.

(51) Int. Cl.
*G06Q 20/32* (2012.01)

(52) U.S. Cl.
CPC ............................... *G06Q 20/3274* (2013.01)

(58) Field of Classification Search
CPC .................................................. G06Q 20/3274
USPC .................................................. 235/380, 381
See application file for complete search history.

(56) References Cited

U.S. PATENT DOCUMENTS

| | | | |
|---|---|---|---|
| 5,952,641 A | 9/1999 | Korshun | |
| D490,840 S | 6/2004 | Arakaki et al. | |
| D491,186 S | 6/2004 | Arakaki et al. | |
| D491,953 S | 6/2004 | Arakaki et al. | |
| D496,365 S | 9/2004 | Liu et al. | |
| D498,236 S | 11/2004 | Liu et al. | |
| D506,998 S | 7/2005 | Liu et al. | |
| 6,925,439 B1 | 8/2005 | Pitroda | |
| D515,574 S | 2/2006 | Colburn | |
| 7,028,897 B2 | 4/2006 | Fernandes et al. | |
| 7,051,932 B2 | 5/2006 | Fernandes et al. | |
| D527,039 S | 8/2006 | Colburn et al. | |
| 7,114,652 B2 | 10/2006 | Moullette et al. | |
| 7,127,236 B2 | 10/2006 | Khan et al. | |
| D543,232 S | 5/2007 | Colburn et al. | |
| D543,582 S | 5/2007 | Colburn et al. | |
| 7,252,232 B2 | 8/2007 | Fernandes et al. | |
| 7,308,426 B1 | 12/2007 | Pitroda | |
| D559,253 S | 1/2008 | Arakaki et al. | |
| 7,357,319 B1 | 4/2008 | Liu et al. | |
| 7,366,990 B2 | 4/2008 | Pitroda | |
| 7,469,151 B2 | 12/2008 | Khan et al. | |
| D586,813 S | 2/2009 | Colburn | |
| 7,494,055 B2 | 2/2009 | Fernandes et al. | |
| 7,516,887 B2 | 4/2009 | Arakaki et al. | |
| 7,631,810 B2 | 12/2009 | Liu et al. | |
| 7,963,443 B2 | 6/2011 | Patton | |

(Continued)

FOREIGN PATENT DOCUMENTS

WO    WO 2009144010 A1 * 12/2009

OTHER PUBLICATIONS

International Search Report and Written Opinion from corresponding PCT application PCT/2012/065402, dated Feb. 22, 2013, 22 pages.

*Primary Examiner* — Toan Ly

(57) ABSTRACT

Among other things, a mobile wireless device can be used for communication of data via an optical representation. The data may represent an instrument of payment and be provided using a display. The optical representation is read by an optical receiver of a second device, and can be translated back into the data. Consequently, a device such as a mobile phone may be used to make or receive payments using optical representations of data.

37 Claims, 13 Drawing Sheets

(56) References Cited

U.S. PATENT DOCUMENTS

| | | |
|---|---|---|
| 7,967,215 B2 | 6/2011 | Kumar et al. |
| D645,871 S | 9/2011 | Khan et al. |
| 8,011,594 B2 | 9/2011 | Johnson, Jr. et al. |
| 2003/0218066 A1 | 11/2003 | Fernandes et al. |
| 2004/0029569 A1 | 2/2004 | Khan et al. |
| 2004/0094624 A1 | 5/2004 | Fernandes et al. |
| 2004/0122771 A1* | 6/2004 | Celi et al. ............ 705/43 |
| 2004/0159700 A1 | 8/2004 | Khan et al. |
| 2005/0139680 A1* | 6/2005 | Anttila et al. ......... 235/462.46 |
| 2005/0247777 A1 | 11/2005 | Pitroda |
| 2006/0000900 A1 | 1/2006 | Fernandes et al. |
| 2006/0064308 A1* | 3/2006 | Foehr ................. 705/1 |
| 2006/0131410 A1 | 6/2006 | Fernandes et al. |
| 2006/0163353 A1 | 7/2006 | Moulette et al. |
| 2006/0175405 A1 | 8/2006 | Fernandes et al. |
| 2007/0194123 A1 | 8/2007 | Frantz et al. |
| 2008/0027815 A1 | 1/2008 | Johnson et al. |
| 2008/0029598 A1 | 2/2008 | Fernandes et al. |
| 2008/0058014 A1 | 3/2008 | Khan et al. |
| 2008/0147508 A1 | 6/2008 | Liu et al. |
| 2008/0177826 A1 | 7/2008 | Pitroda |
| 2008/0236991 A1 | 10/2008 | Arakaki et al. |
| 2008/0237345 A1 | 10/2008 | Moullette et al. |
| 2008/0306849 A1 | 12/2008 | Johnson, Jr. et al. |
| 2009/0094126 A1* | 4/2009 | Killian et al. ............. 705/17 |
| 2009/0108064 A1 | 4/2009 | Fernandes et al. |
| 2009/0204530 A1 | 8/2009 | Hanson |
| 2009/0254479 A1* | 10/2009 | Pharris ................. 705/42 |
| 2010/0076833 A1 | 3/2010 | Nelsen |
| 2010/0082444 A1* | 4/2010 | Lin et al. ............... 705/17 |
| 2010/0138344 A1 | 6/2010 | Wong et al. |
| 2011/0137797 A1 | 6/2011 | Stals et al. |
| 2011/0159857 A1 | 6/2011 | Faith et al. |
| 2011/0202425 A1* | 8/2011 | Hui ............. G06Q 30/0633 705/26.8 |
| 2011/0251910 A1 | 10/2011 | Dimmick |
| 2011/0276511 A1* | 11/2011 | Rosenberg .............. 705/345 |
| 2012/0187187 A1* | 7/2012 | Duff ............. G06Q 20/3276 235/382 |

\* cited by examiner

USING A MOBILE DEVICE IN A COMMERCIAL TRANSACTION

CROSS-REFERENCE TO RELATED APPLICATIONS

Priority is claimed to U.S. Provisional Patent Application 61/560,996, titled Optical Communication, filed Nov. 17, 2011, which is incorporated by reference.

BACKGROUND

Wireless mobile devices have changed many aspects of daily life. For example, laptop computers, PDAs, tablets and mobile phones utilize radio frequency (RF) links to allow people to create and consume content from any place where network access is available, and to communicate with one another using voice, video, text messaging and email. Many of these devices can also be used for electronic commerce. Electronic commerce generally includes both remote transactions, e.g., visiting a website via a web browser, and point-of-sale type transactions. Remote transactions typically involve a wireline connection, and may involve a long range wireless access link. A point-of-sale type transaction typically involves short range wireless communication and a wireline back-end. For example, a mobile phone can be used to make a payment by communicating credit or debit card information to a vendor, or by directing a third party to make a payment to the vendor. The ability to make point-of-sale payments with a mobile wireless device potentially offers the convenience of not having to carry cash and credit/debit cards.

SUMMARY

Aspects may include:

A method comprising: enabling a hand-held device (a) to capture optical information received from another device, the optical information carrying transaction data that can be used to charge a buyer in a commercial transaction in which a user of the hand-held device is a seller, and (b) to cause the commercial transaction to be consummated at a remote location using the transaction data. In some implementations the hand-held device comprises a mobile telephone. In some implementations the optical information comprises an image. In some implementations the optical information comprises a barcode. In some implementations the other device comprises a hand-held device the user of which is a buyer in the commercial transaction. In some implementations the transaction data comprises characters representing a credit card or a debit card. In some implementations the commercial transaction is consummated by a payment clearing facility. Some implementations comprise enabling the hand-held device to derive the transaction data from the optical information and to send the transaction data to the remote location.

A computer program on a non-transitory computer-readable medium comprising: logic which enables a hand-held device (a) to capture optical information received from another device, the optical information carrying transaction data that can be used to charge a buyer in a commercial transaction in which a user of the hand-held device is a seller, and (b) to cause the commercial transaction to be consummated at a remote location using the transaction data. In some implementations the hand-held device comprises a mobile telephone. In some implementations the optical information comprises an image. In some implementations the optical information comprises a barcode. In some implementations the other device comprises a hand-held device the user of which is a buyer in the commercial transaction. In some implementations the transaction data comprises characters representing a credit card or a debit card. In some implementations the commercial transaction is consummated by a payment clearing facility. Some implementations comprise logic which enables the hand-held device to derive the transaction data from the optical information and to send the transaction data to the remote location. Apparatus comprising: a hand-held device which (a) captures optical information received from another device, the optical information carrying transaction data that can be used to charge a buyer in a commercial transaction in which a user of the hand-held device is a seller, and (b) causes the commercial transaction to be consummated at a remote location using the transaction data. In some implementations the hand-held device comprises a mobile telephone. In some implementations the optical information comprises an image. In some implementations the optical information comprises a barcode. In some implementations the other device comprises a hand-held device the user of which is a buyer in the commercial transaction. In some implementations the transaction data comprises characters representing a credit card or a debit card. In some implementations the commercial transaction is consummated by a payment clearing facility. In some implementations the hand-held device derives the transaction data from the optical information and sends the transaction data to the remote location. A method comprising enabling a hand-held device to send optical information to another device, the optical information carrying transaction data that can be used to charge a buyer in a commercial transaction in which the user of the hand-held device is a buyer, the sending of the optical information to the other device comprising an authorization to the other device to charge the buyer in connection with the commercial transaction. In some implementations the hand-held device comprises a mobile telephone. In some implementations the optical information comprises an image. In some implementations the optical information comprises a barcode. In some implementations the other device comprises a hand-held device the user of which is a seller in the commercial transaction. In some implementations the transaction data comprises characters representing a credit card or a debit card. In some implementations the commercial transaction is consummated by a payment clearing facility. Some implementations comprise enabling the hand-held device to derive the transaction data from the optical information and to send the transaction data to the remote location. A computer program on a non-transitory computer-readable medium comprising: logic enabling a hand-held device to send optical information to another device, the optical information carrying transaction data that can be used to charge a buyer and a commercial transaction in which the user of the hand-held device is a buyer, the sending of the optical information to the other device comprising an authorization to the other device to charge the buyer in connection with the commercial transaction. In some implementations the hand-held device comprises a mobile telephone. In some implementations the optical information comprises an image. In some implementations the optical information comprises a barcode. In some implementations the other device comprises a hand-held device the user of which is a seller in the commercial transaction. In some implementations the transaction data comprises characters representing a credit card or a debit card. In some implementations the commercial transaction is consummated by a payment clearing facility. Some implementations comprise enabling the hand-held device to derive the transaction data from the optical information and to send the transaction data to the remote location. Apparatus comprising: a hand-held device which sends optical information to another device, the optical information carrying transaction data that can be used to charge a buyer and a commercial transaction in which the user of the hand-held device is a buyer, the sending of the optical information to the other device comprising an authorization to the other device to charge the buyer in connection with the commercial transaction. In some implementations the hand-held device comprises a mobile telephone. In some implementations the optical information comprises an image. In some implementations the optical information comprises a barcode. In some implementations the other device comprises a hand-held device the user of which is a seller in the commercial transaction. In some implementations transaction data comprises characters representing a credit card or a debit card. In some implementations the commercial transaction is consummated by a payment clearing facility. Some implementations comprise enabling the hand-held device to derive the transaction data from the optical information and to send the transaction data to the remote location. A method comprising: enabling a hand-held device (a) to receive a user's selection, from among two or more different transaction payment instruments that are associated with the user, of a payment instrument to be used to make a payment in a commercial transaction, and (b) to transmit optically to another device identifying data that is associated with the selected payment instrument and is sufficient to enable the other device to complete the payment in the commercial transaction. In some implementations the transaction payment instruments comprise consumer credit or debit instruments. In some implementations the user selection is enabled by a user interface exposed by the hand-held device to the user. A computer program on a non-transitory computer-readable medium comprising: logic enabling a hand-held device (a) to receive a user's selection, from among two or more different transaction payment instruments that are associated with the user, of a payment instrument to be used to make a payment in a commercial transaction, and (b) to transmit optically to another device identifying data that is associated with the selected payment instrument and is sufficient to enable the other device to complete the payment in the commercial transaction. In some implementations the transaction payment instruments comprise consumer credit or debit instruments. In some implementations the user selection is enabled by a user interface exposed by the hand-held device to the user. Apparatus comprising: a hand-held device enabled (a) to receive a user's selection, from among two or more different transaction payment instruments that are associated with the user, of a payment instrument to be used to make a payment in a commercial transaction, and (b) to transmit optically to another device identifying data that is associated with the selected payment instrument and is sufficient to enable the other device to complete the payment in the commercial transaction. In some implementations the transaction payment instruments comprise consumer credit or debit instruments. In some implementations the user selection is enabled by a user interface exposed by the hand-held device to the user. A method comprising: enabling a hand-held device (a) to capture optical information received from another device, the optical information carrying data that identifies one or more items being sold from the other device to the user of the hand-held device, (b) to cause payment for the one or more items to be authorized at a remote location, and (c) to optically send to the other device information confirming the payment. In some implementations the hand-held device comprises a mobile telephone. In some implementations the optical information comprises a barcode. In some implementations the optical information comprises printed material. In some implementations the optical information comprises electronically displayed information. In some implementations the items being sold comprise consumable consumer items. In some implementations the items being sold comprise services. In some implementations the other device comprises a vending machine. In some implementations the other device comprises a parking meter. A computer program on a non-transitory computer-readable medium comprising: logic enabling a hand-held device (a) to capture optical information received from another device, the optical information carrying data that identifies one or more items being sold from the other device to the user of the hand-held device, (b) to cause payment for the one or more items to be authorized at a remote location, and (c) to optically send to the other device information confirming the payment. In some implementations the hand-held device comprises a mobile telephone. In some implementations the optical information comprises a barcode. In some implementations the optical information comprises printed material. In some implementations the optical information comprises electronically displayed information. In some implementations the items being sold comprise consumable consumer items. In some implementations the items being sold comprise services. In some implementations the other device comprises a vending machine. In some implementations the other device comprises a parking meter. Apparatus comprising: a hand-held device enabled (a) to capture optical information received from another device, the optical information carrying data that identifies one or more items being sold from the other device to the user of the hand-held device, (b) to cause payment for the one or more items to be authorized at a remote location, and (c) to optically send to the other device information confirming the payment. In some implementations the hand-held device comprises a mobile wireless device. In some implementations the optical information comprises a barcode. In some implementations the optical information comprises printed material. In some implementations the optical information comprises electronically displayed information. In some implementations the items being sold comprise consumable consumer items. In some implementations the items being sold comprise services. In some implementations the other device comprises a vending machine. In some implementations the other device comprises a parking meter. A method comprising:

enabling a hand-held device (a) to carry information that represents as many tangible payment devices associated with a user as the user of the hand-held device chooses to be represented, and (b) to send optical information to other devices on behalf of the user to cause payment to be made in each of one or more commercial transactions, using the representative information for any one of the payment devices that is selected by the user for the commercial transaction. A computer program on a non-transitory computer-readable medium comprising:

logic enabling a hand-held device (a) to carry information that represents as many tangible payment devices associated with a user as the user of the hand-held device chooses to be represented, and (b) to send optical information to other devices on behalf of the user to cause payment to be made in each of one or more commercial transactions, using the representative information for any one of the payment devices that is selected by the user for the commercial transaction. Apparatus comprising:

a hand-held device enabled (a) to carry information that represents as many tangible payment devices associated with a user as the user of the hand-held device chooses to be represented, and (b) to send optical information to other devices on behalf of the user to cause payment to be made in each of one or more commercial transactions, using the representative information for any one of the payment devices that is selected by the user for the commercial transaction. A method for communicating data from a first device to a second device comprising: generating an optical representation of the data; presenting the optical representation on a display of the first device; detecting the displayed optical representation using the second device; and re-generating the data from the optical representation, wherein at least one of the first and second devices comprises a mobile wireless device. Some implementations comprise providing information associated with an instrument of payment in the optical representation. Some implementations comprise transmitting the information to a third device to prompt a payment. In some implementations generating the optical representation includes generating at least one of a one dimensional barcode, multi-dimensional barcode, High Capacity Color Barcode, matrix barcode, Quick Response code, Tag, and light intensity modulation. Some implementations comprise providing information associated with a transaction in the optical representation. Some implementations comprise transmitting the sale information and instrument of payment information from the second device to a third device. Some implementations comprise the third device prompting payment and transmitting a verification to the second device. Some implementations comprise transmitting the verification from the third device to the first device. Apparatus comprising: a first device having data stored in memory, a display, and computer program code stored on a non-transitory computer-readable medium which generates an optical representation of the data and presents the optical representation on the display; and a second device having a receiver and computer program code stored on a non-transitory computer-readable medium which reads the displayed optical representation and generates the data from the optical representation; wherein at least one of the first and second devices comprises a mobile wireless device. In some implementations the data includes information associated with an instrument of payment. In some implementations the information is transmitted by the second device to a third device which prompts a payment. In some implementations the optical representation includes at least one of a one dimensional barcode, multi-dimensional barcode, High Capacity Color Barcode, matrix barcode, Quick Response code, Tag, and light intensity. In some implementations the data includes information associated with a transaction. In some implementations the second device transmits the transaction information and instrument of payment information to a third device. In some implementations the third device prompts payment and transmits a verification to the second device. In some implementations the third device transmits the verification to the first device. Computer program code stored in non-transitory computer-readable memory for communicating data stored in memory of a first device to a second device comprising: logic for generating an optical representation of the data; logic for presenting the optical representation on a display of the first device; logic for reading the displayed optical representation with a receiver of the second device; and logic for generating the data from the optical representation, wherein at least one of the first and second devices is a mobile wireless device. Some implementations comprise logic for providing information associated with an instrument of payment in the optical representation. Some implementations comprise logic for transmitting the information to a third device which prompts a payment. In some implementations the logic for generating the optical representation includes logic for generating at least one of a one dimensional barcode, multi-dimensional barcode, High Capacity Color Barcode, matrix barcode, Quick Response code and Tag, or other optical representations, or light intensity modulation. Some implementations comprise logic for providing information associated with a transaction in the optical representation. Some implementations comprise logic for transmitting the transaction information and instrument of payment information from the second device to a third device. Some implementations comprise logic for prompting payment and logic for transmitting a verification from the third device to the second device. Some implementations comprise logic for transmitting the verification from the third device to the first device. A method for performing a transaction with a first device to a second device, where the first device lacks network access, comprising: the first device generating a optical representation of data; presenting the optical representation on a display of the first device; detecting the displayed optical representation using the second device; the second device providing the data and information associated with an instrument of payment to a third device; the third device providing an indication of payment verification to the second device; and the second device providing the indication of payment verification to the first device, wherein at least one of the first and second devices comprises a mobile wireless device. Some implementations comprise encrypting the information associated with an instrument of payment provided to the third device. Some implementations comprise encrypting the indication of payment verification provided to the second device. Computer program code stored in non-transitory computer-readable memory for performing a transaction with a first device and a second device, where the first device lacks network access, comprising: logic of the first device generating a optical representation of data including an indication of transaction legitimacy; logic presenting the optical representation on a display of the first device; logic detecting the displayed optical representation using the second device; logic of the second device providing the data and information associated with an instrument of payment to a third device; logic of the third device providing an indication of payment verification to the second device; and logic of the second device providing the indication of payment verification to the first device, wherein at least one of the first and second devices comprises a mobile wireless device. In some implementations the information associated with an instrument of payment provided to the third device is encrypted. In some implementations the indication of payment verification provided to the second device is encrypted. Apparatus comprising: a first device which generates an optical representation of data including an indication of transaction legitimacy and presents the optical representation on a display; a second device which detects the displayed optical representation and transmits the data and information associated with an instrument of payment; a third device which receives the information associated with an instrument of payment from the second device and provides an indication of payment verification to the second device; and the second device providing the indication of payment verification to the first device, wherein at least one of the first and second devices comprises a mobile wireless device. In some implementations the information associated with an instrument of payment provided by the second device is encrypted. In some implementations the indication of payment verification provided to the second device is encrypted. A method comprising enabling a mobile device, which is in the vicinity of a vending device, to permit the vending device to confirm indirectly with a payment processor, a payment from an account of a holder of the mobile device for an item or service being sold from the passive vending device to the holder, without the vending device confirming the payment directly with the payment processor, the mobile device optically sensing an identity of the item or service and its price as provided optically by the vending device, executing the payment from the account, and providing an authentic indication to the vending device that the payment has been executed.

Communication via an optical representation has certain advantages over RF and other technologies. For example, communication via an optical representation is useful where wireless communication is desired but use of RF spectrum is undesirable. Further, such communication is advantageously more secure than RF communications, including NFC, because the range over which the communication is made can be less than NFC, and is directional and more easily shielded from rogue devices. Consequently, communication via an optical representation may be particularly useful for financial transactions with mobile devices. For example, a user can make or receive a payment by transmitting data such as credit/debit card information using an optical representation. The sending and receiving devices can be positioned in such close proximity that the risk of interception by a misfeasor is relatively low.

Some aspects can advantageously be implemented using existing mobile devices. For example, programs for generating and displaying the optical representation, reading the optical representation, and translating the optical representation into the original data may be implemented in applications which can be downloaded to mobile phones, PDAs, tablets and laptops, e.g., from "app stores" such as Amazon Appstore, Android and/or Apple. Although wireline connectivity could be utilized, mobile devices that are WiFi enabled or have built in wireless (3G) capability are particularly suitable for generating and presenting the image to make a payment. The widespread use and availability of "smartphones" presents the possibility that accepting payment via credit/debit card may become practical for individuals and organizations for which it is currently impractical. In other words, a mobile phone can be used instead of a POS card reader device to accept payment by credit or debit card. Further, it helps obviate the need for carrying physical cards and cash to make payments.

Other features and advantages will be apparent from the drawing and the following description.

DESCRIPTION

Figure 6:
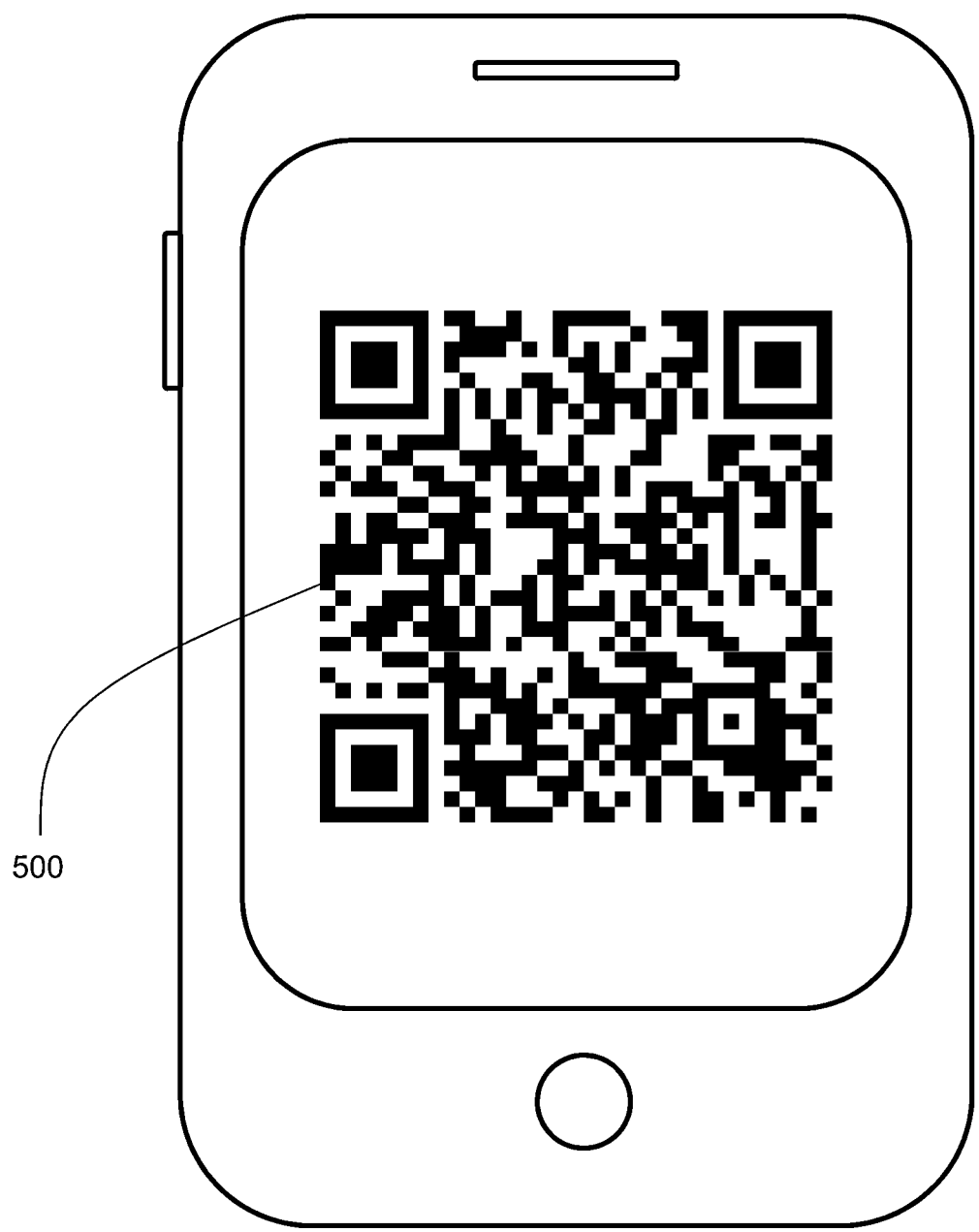

FIG. 6 a graphical representation of data including a QR code.

Figure 7:
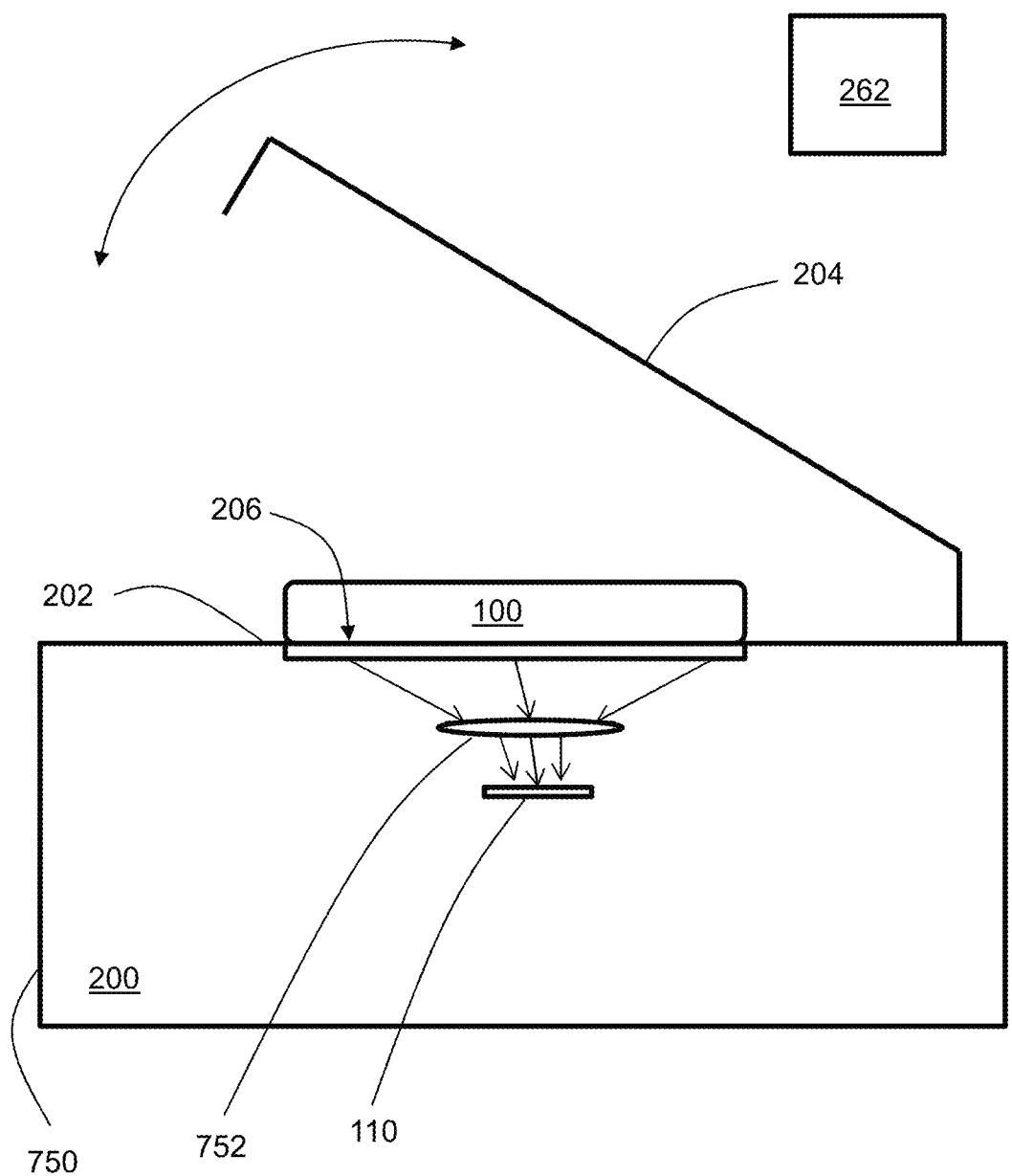

FIG. 7 illustrates a POS seller's device.

Figure 8:
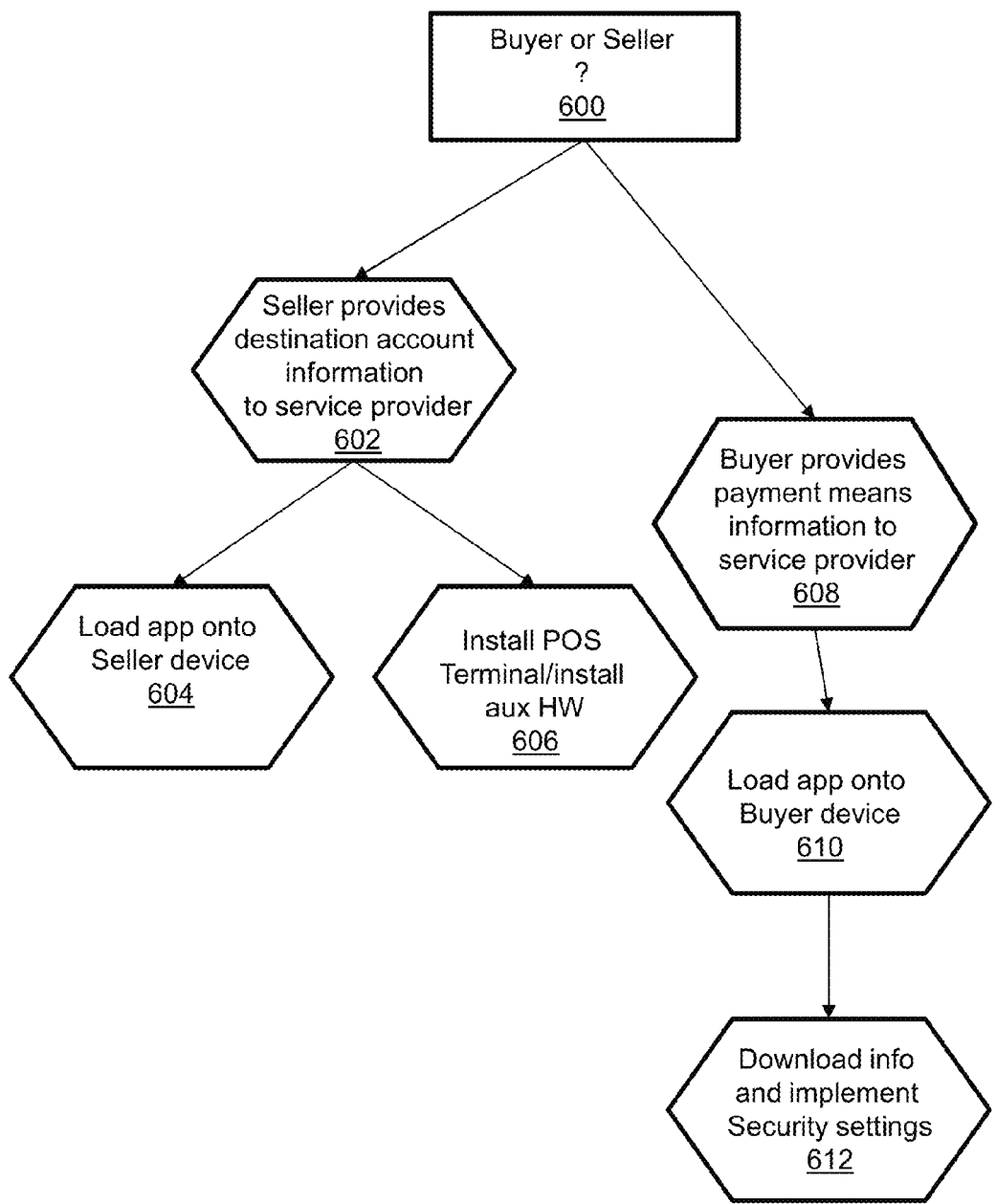

FIG. 8 is a flow diagram which illustrates provisioning a new member.

Figure 9:
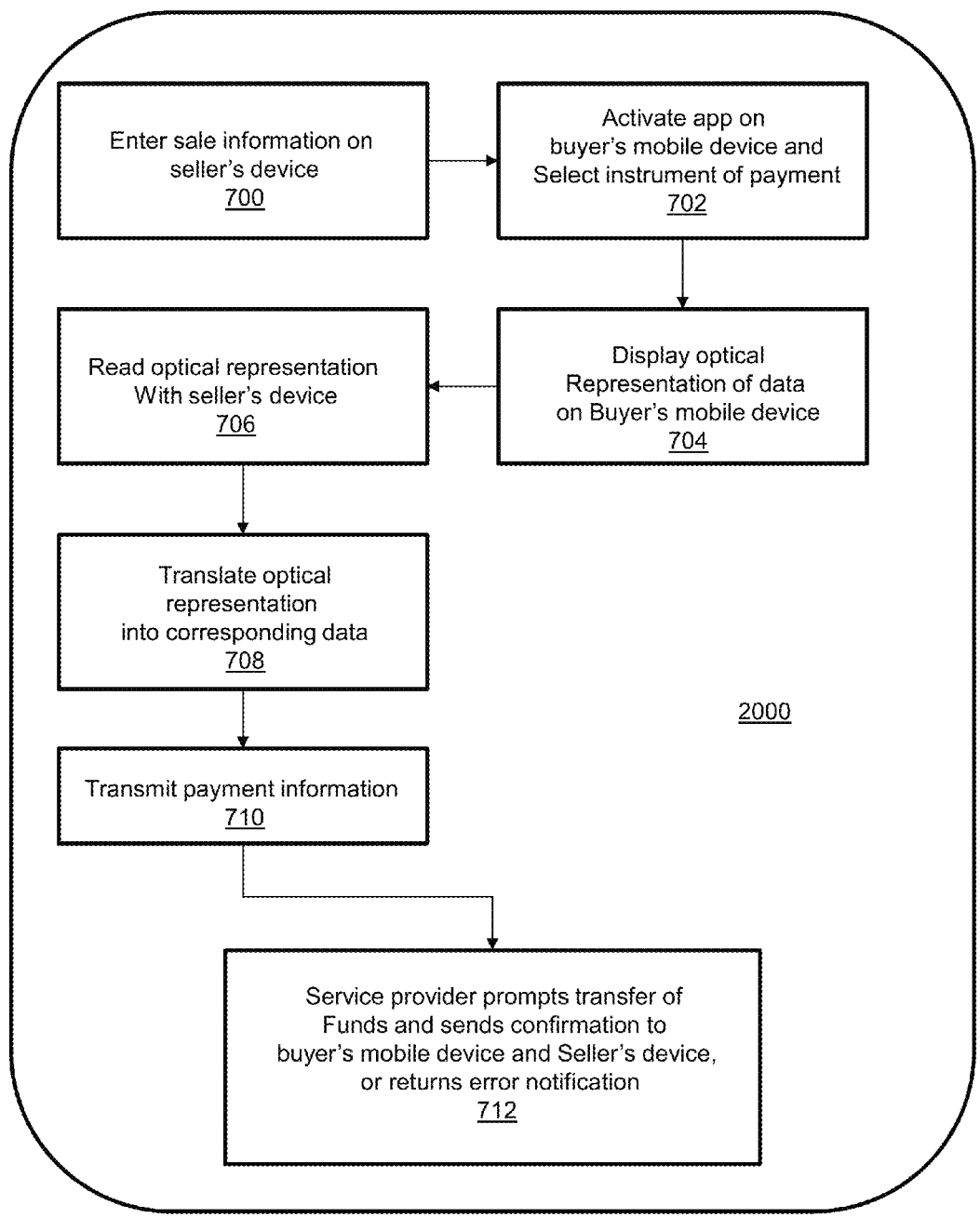

FIG. 9 is a flow diagram which illustrates a transaction.

Figure 10:
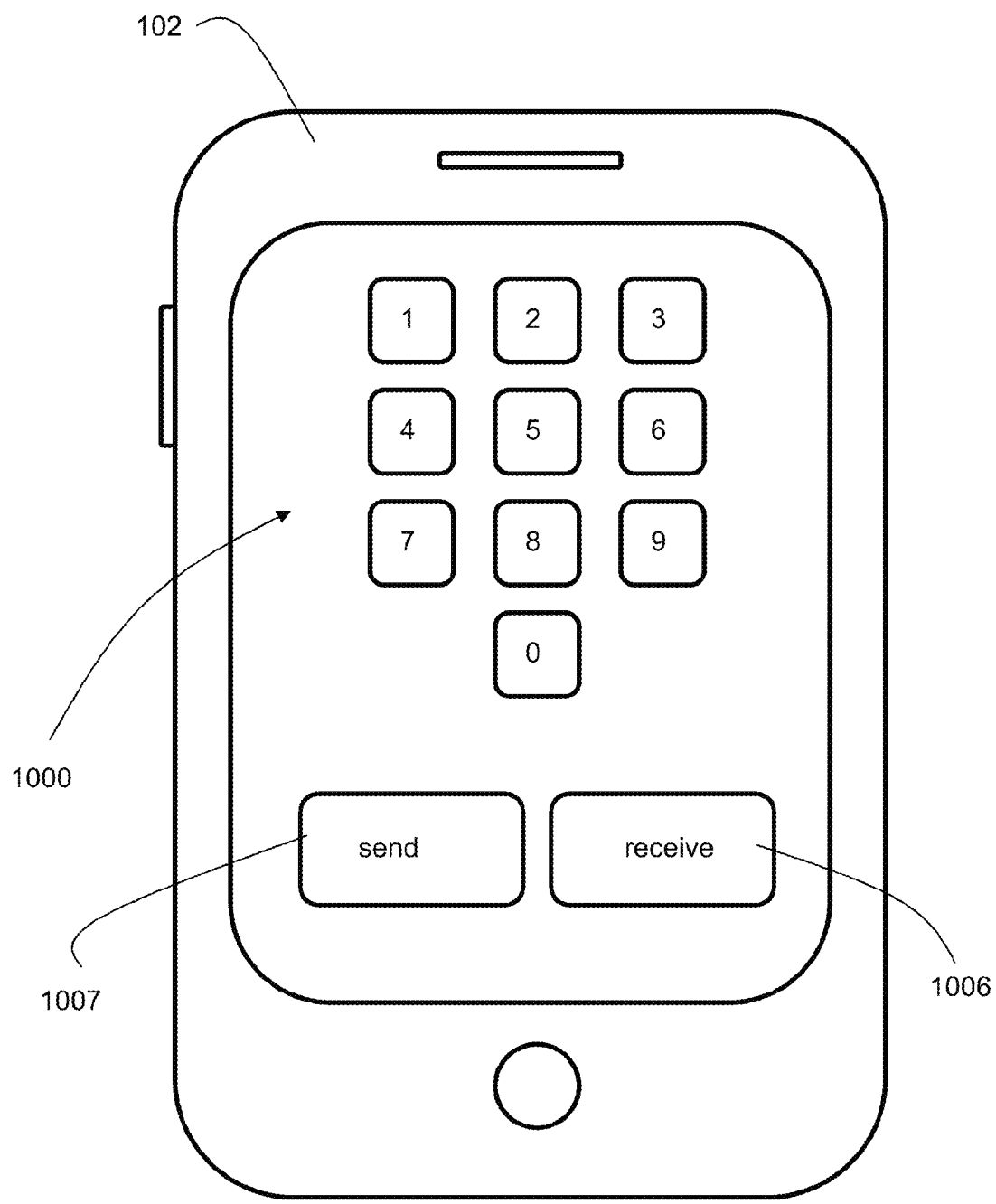
Figure 11:
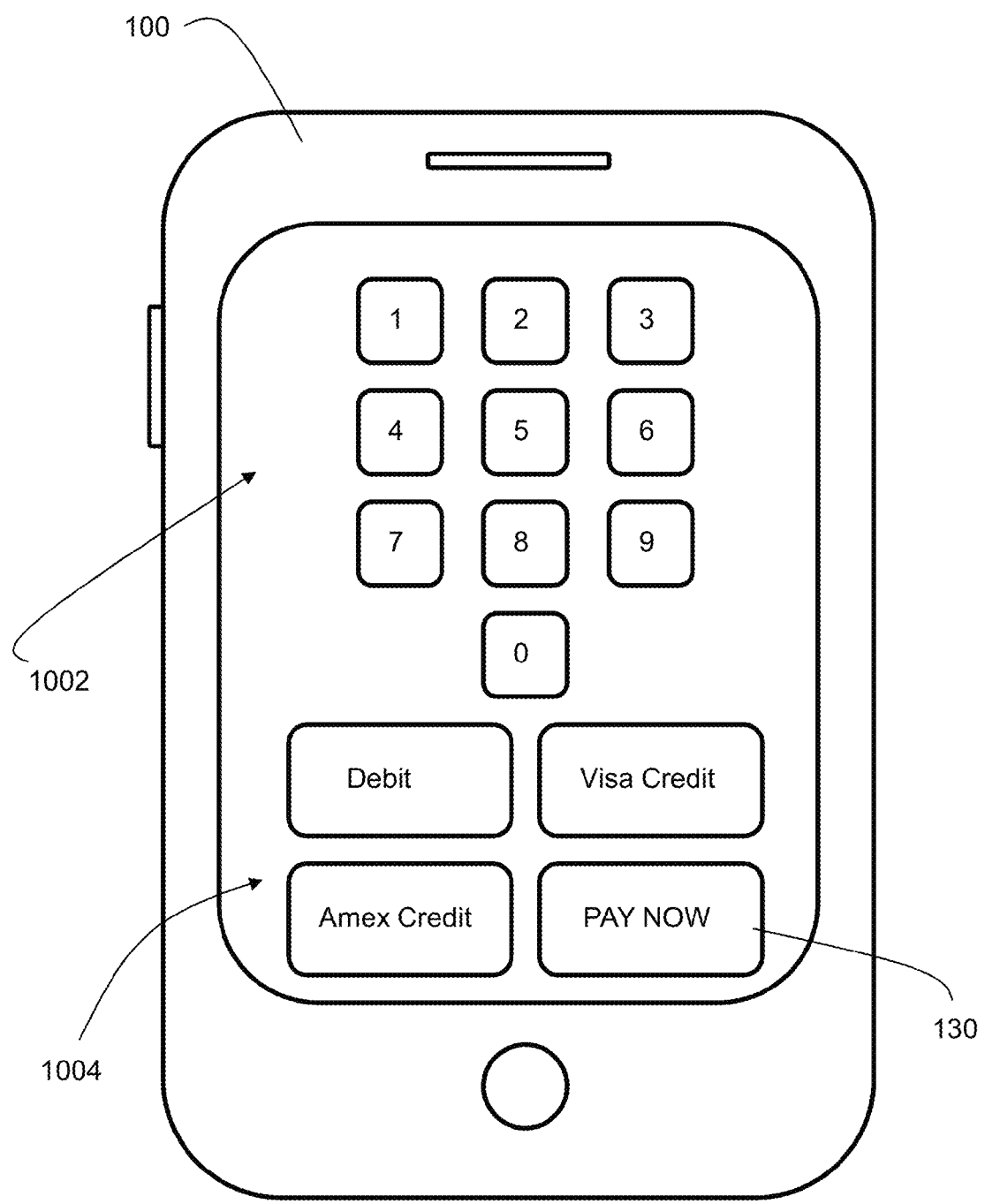

FIGS. 10 and 11 illustrate user interfaces.

Figure 12:
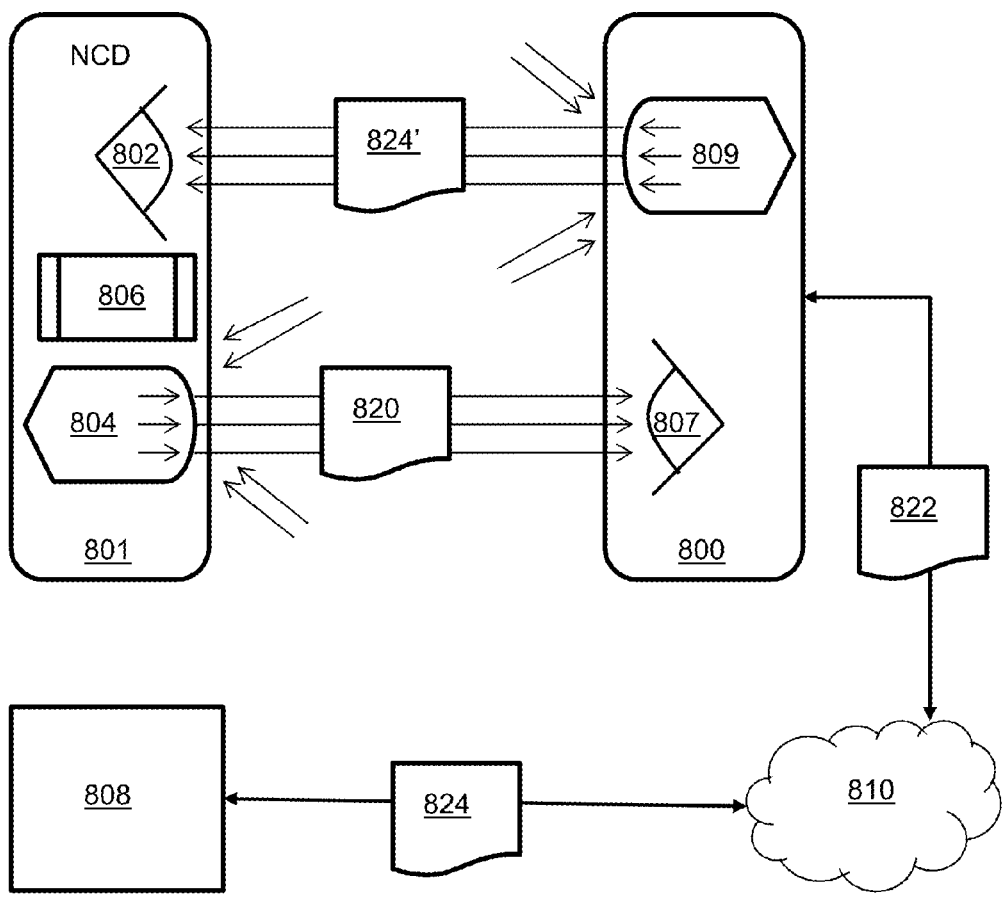

FIG. 12 is a block diagram which illustrates a transaction with a non-communicating seller's device.

Figure 13:
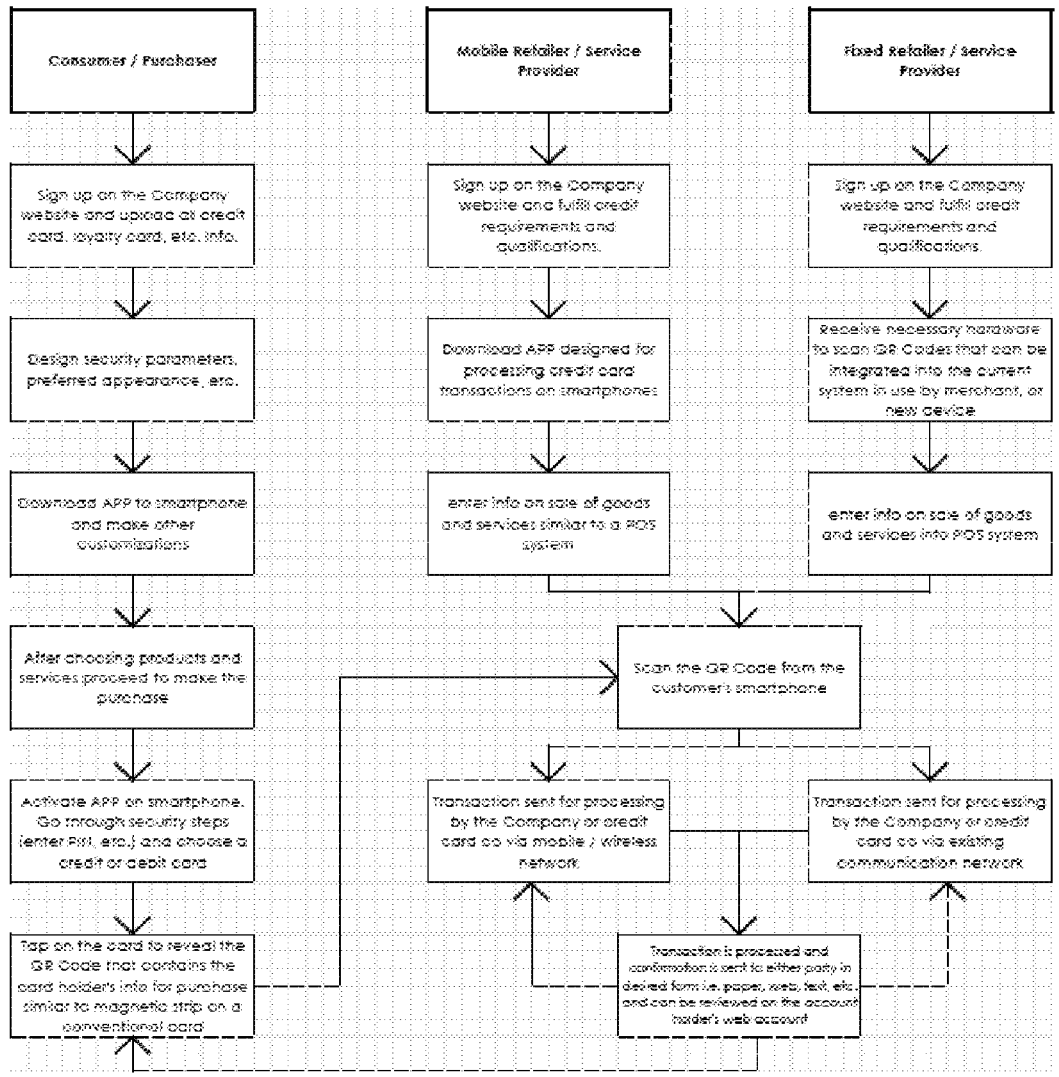

FIG. 13 is from the corresponding provisional application.

Figure 1:
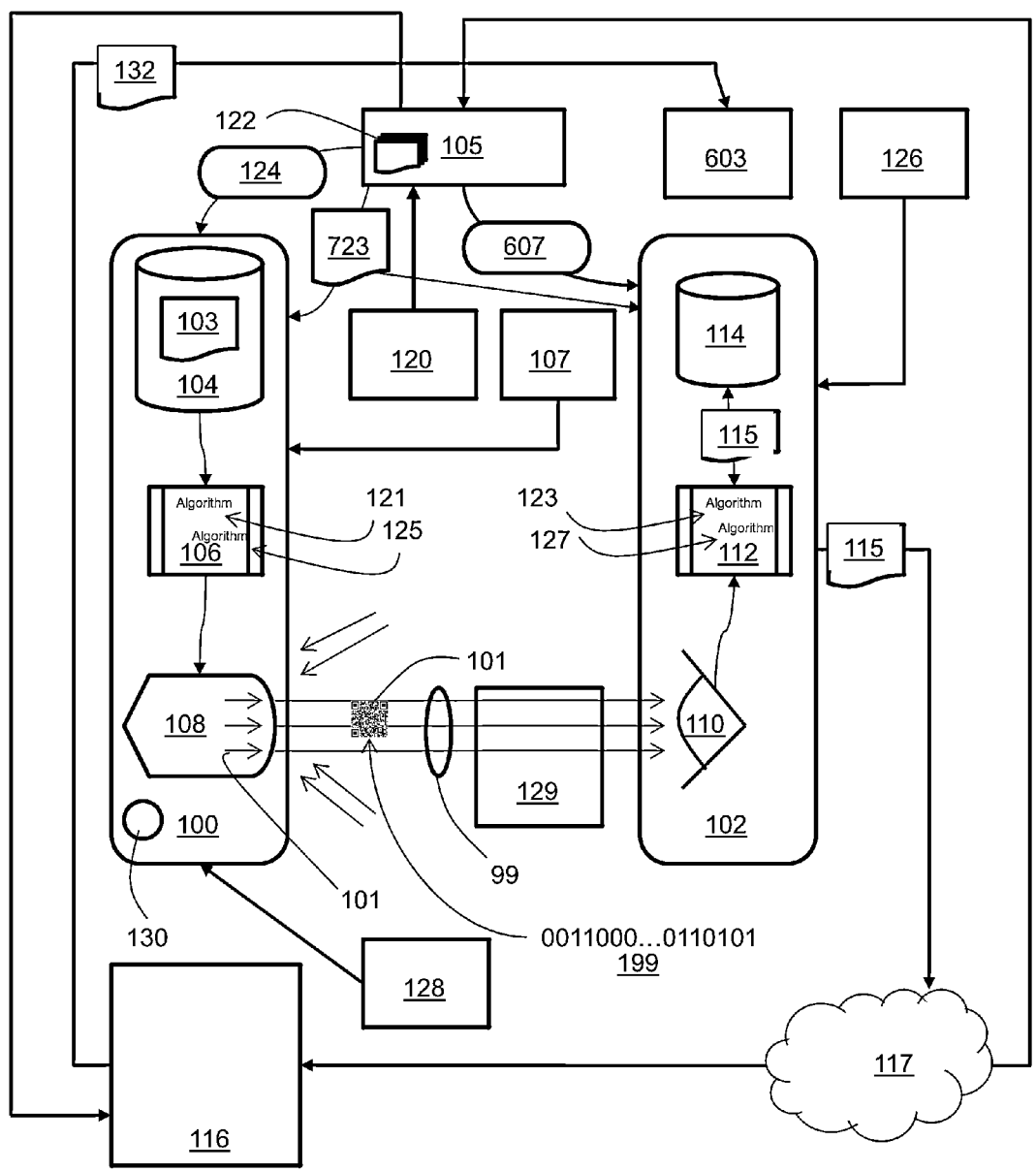
FIG. 1 is a block diagram which illustrates use of optical representations to communicate.

Referring to FIG. 1, short range communication 99 of data 103 can be accomplished by generating an optical representation 101 of data 103 (we sometimes refer to an optical representation of data as optical information) using a feature such as a display 108 of a first device 100 and sensed using a feature such as an optical sensor 110 of a second device 102 and then read (we sometimes say captured) from the sensed optical representation 101. The data 103 to be communicated may be in a binary format and stored in non-transitory computer-readable memory 104 on the first device 100, or it may be generated each time by a service provider 105 and sent to the first device 100, or it may come from some other source 107. The data may be translated into the optical representation (that is, an optical representation of the data can be generated) using processing logic 106 associated with the first device 100. In some examples, the optical representation is then rendered (in some cases as a graphical representation such as an image) on the display 108 associated with the first device 100. The displayed optical representation is sensed by the optical sensor 110 associated with the second device 102. The optical information carried in the sensed optical representation may be translated back into a representation of the original data using corresponding inverse processing logic 112. The back-translated data 115 can be used, stored, processed, forwarded, merged with other data, or any combination of two or more of those activities and others, in a wide variety of ways. In some implementations, the back-translated data 115 is stored in non-transitory computer-readable memory 114, transmitted through a communication network 117 by the second device to another device 116 to prompt some action, or both. The data can be any of a broad range of different kinds of data. In some examples, the data is transaction data that relates to, describes, or permits the effectuation of a transaction between two parties. For example, the data can be information that can be used to charge a buyer in a commercial transaction involving goods or services or both.

A very wide variety of existing and future types of devices could be utilized as the first device 100 or and the second device 102 or both. For example, and without limitation, at least one of the devices might be a mobile wireless device that can be easily transported to a particular location in order to transmit data, receive data, or both. Examples of such devices include, but are not limited to, mobile computers, PDAs, tablets, mobile phones, digital displays, cameras (e.g., CCD array), scanners and POS terminals. We sometimes refer broadly to such devices and any other devices that can be hand held and that have wireless communication capability as hand-held devices. In some examples, the handheld device is a mobile phone that communicates using at least one of a cellular telephone, Wi-Fi, Bluetooth, or similar protocol, or some combination of two or more of those. In some cases, one of the devices need not be mobile or wireless or handheld or any of those, but instead can be temporarily or permanently fixed, stationary, mounted, heavy, too large to move easily, or have other such characteristics. The two devices whatever their form are devices that have positions, orientations, or locations, or two or more of those, that enable the optical information to be passed directly or indirectly from one to the other optically along a path. In some cases, the path is at least partially through the air.

In some examples, one of both of the devices are carried to a place where the optical information can be passed between them, for example, by a hand-held device such as a mobile phone or tablet computing device being carried to a place where it is in proximity to another hand-held or non-hand-held device to enable the optical information to be communicated between them.

In some implementations, each of the devices is owned by, controlled by, in the possession of, or otherwise associated with a particular person or entity that is one of the parties to a transaction. When an entity is on one side of the transaction, the entity may be a retail business that is a seller of goods or services or a person, the other party may be a person carrying the hand-held device and who is the buyer of the goods or services, and the transaction may be a purchase and sale between the two parties.

In some cases, it may be possible for there to be more than two devices and more than two parties involved in a transaction, and the optical information may be communicated between pairs of the devices or all three devices simultaneously.

The communication between any pair of devices can be one-directional communication of data, or two-directional, or may be each of those at different times. We sometimes refer to a device as a sending device or as a receiving device depending on its role in a given communication. In this sense, a given device, such as a person's mobile phone can serve its associated person or entity acting as a buyer or as a seller at different times or at the same time.

The creation, communication, and back-translation of the optical information, and combinations of any two or more of those activities will require functions or processes to be performed by one or more of the devices that may be implemented in computer software 121, 123 that can be loaded on non-transitory computer-readable memory 104, 114 and used by processors 106 and 112 in order to, for example, transmit or receive optical, e.g., graphical, representations of data. Other functions may be associated with auxiliary physical devices such as device 200 (FIG. 7) which may include electronic components which are used with one of the devices in order to provide the ability to transmit or receive, for example, graphical representations of data.

In some implementations, each of the devices can be a general purpose device that includes a process and/or processor and a general purpose operating system and application software that carries out the needed functions. It should also be appreciated that, in some implementations, either or both the sending and receiving devices for a given communication may be designed and built specifically for the purposes of transmitting and receiving optical representations of data or for doing so in carrying out the features that we describe here. However, the possibility of implementing features with computer software and auxiliary physical devices such as device 200 (FIG. 7) may be advantageous because replacement of existing infrastructure may be mitigated.

Figure 2:
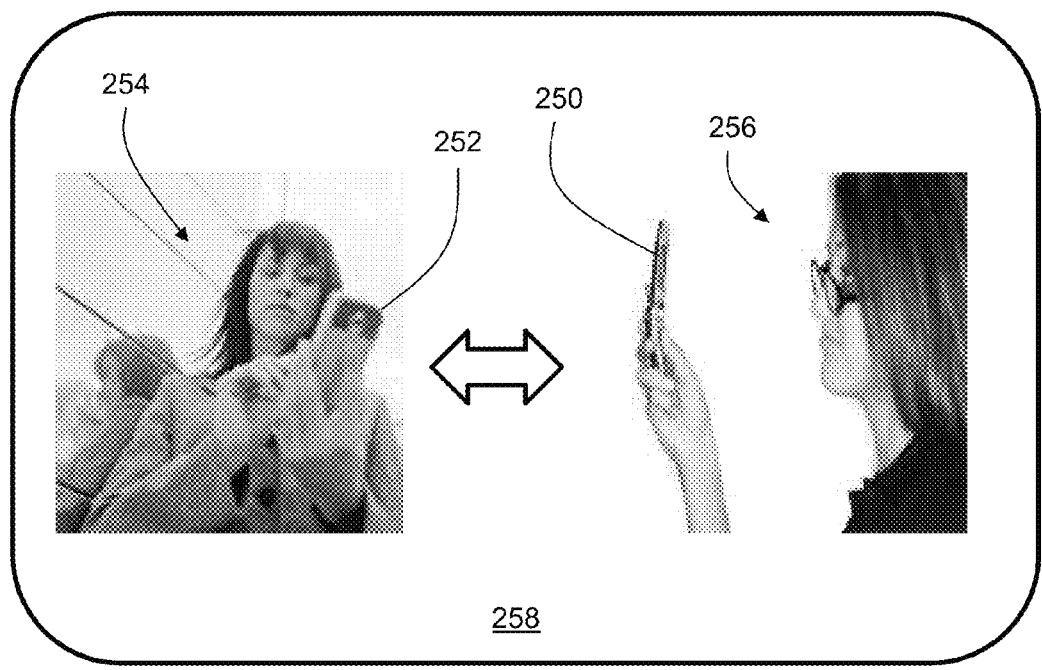
FIG. 2 illustrates a buyer and seller in a transaction.

Referring to the implementations illustrated in FIGS. 1 and 2, the system and techniques that we describe here enable, for example, a hand-held device 250 to capture optical information received from another hand-held device 252, the optical information carrying transaction data 199 that can be used to charge a buyer 254 in a commercial transaction 258 in which a user 256 of the hand-held device is a seller, and (b) to cause the commercial transaction to be consummated at a remote location 116 or 105 using the transaction data.

In some implementations, transaction data created and communicated by one device to another device is sent to a third device for the purpose of effecting a payment contemplated by the transaction, or to perform a wide variety of other activities associated with the transaction or with the parties to the transaction or with respect to the devices. For this purpose, one or more of the devices may communicate all or part of the data over a wide variety of communication channels to one or more third devices located anywhere. In some examples, the third devices are located remotely or centrally. The third devices may be under the control of other parties and there may be a combination of third devices located in various places and capable of performing payment clearance, billing, collection, and other functions on behalf of one or more of the parties, of one or more financial institutions that maintain accounts on behalf of one or more of the parties.

Figure 4:
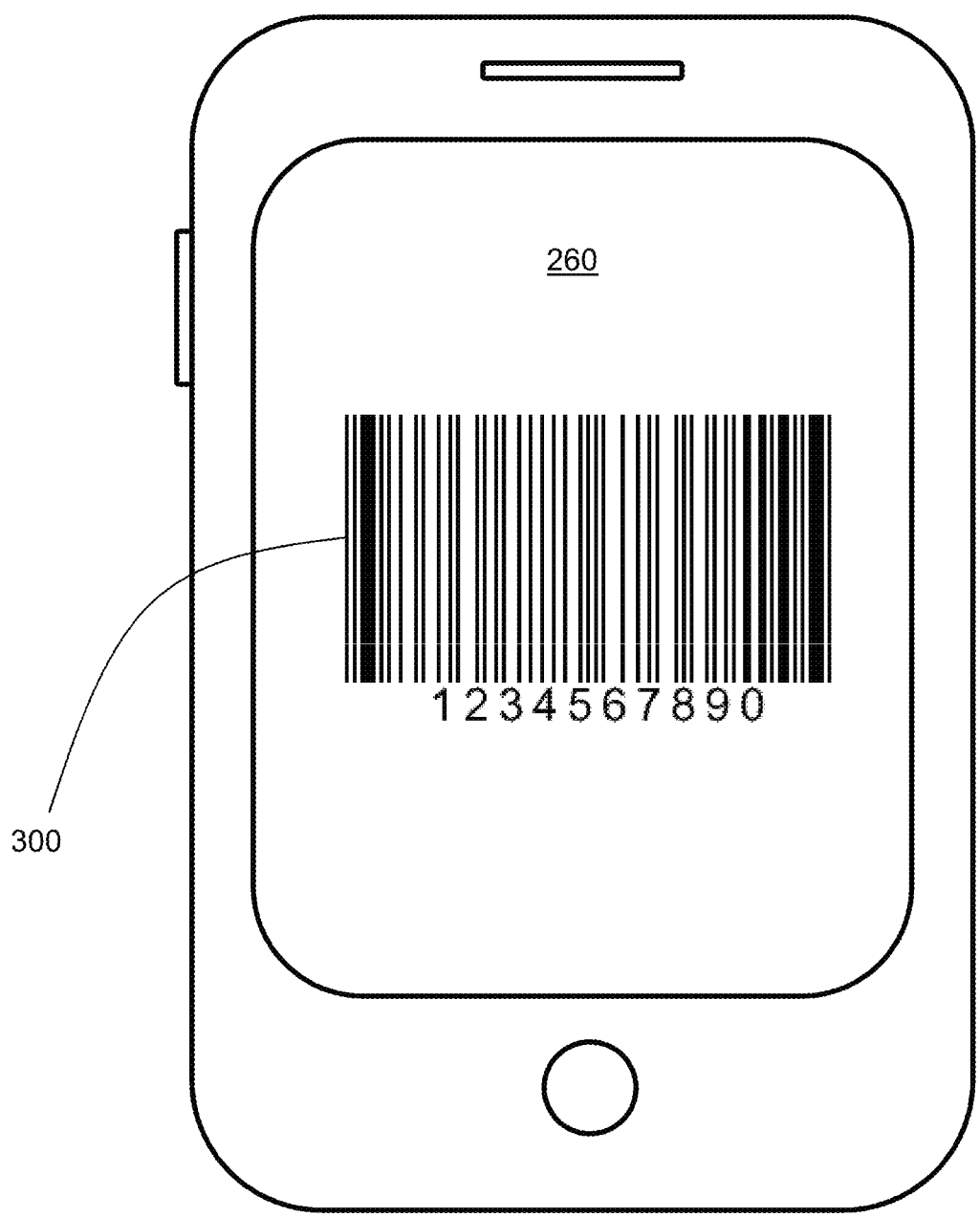
FIG. 4 illustrates a graphical representation of data including a 1D barcode.
Figure 5:
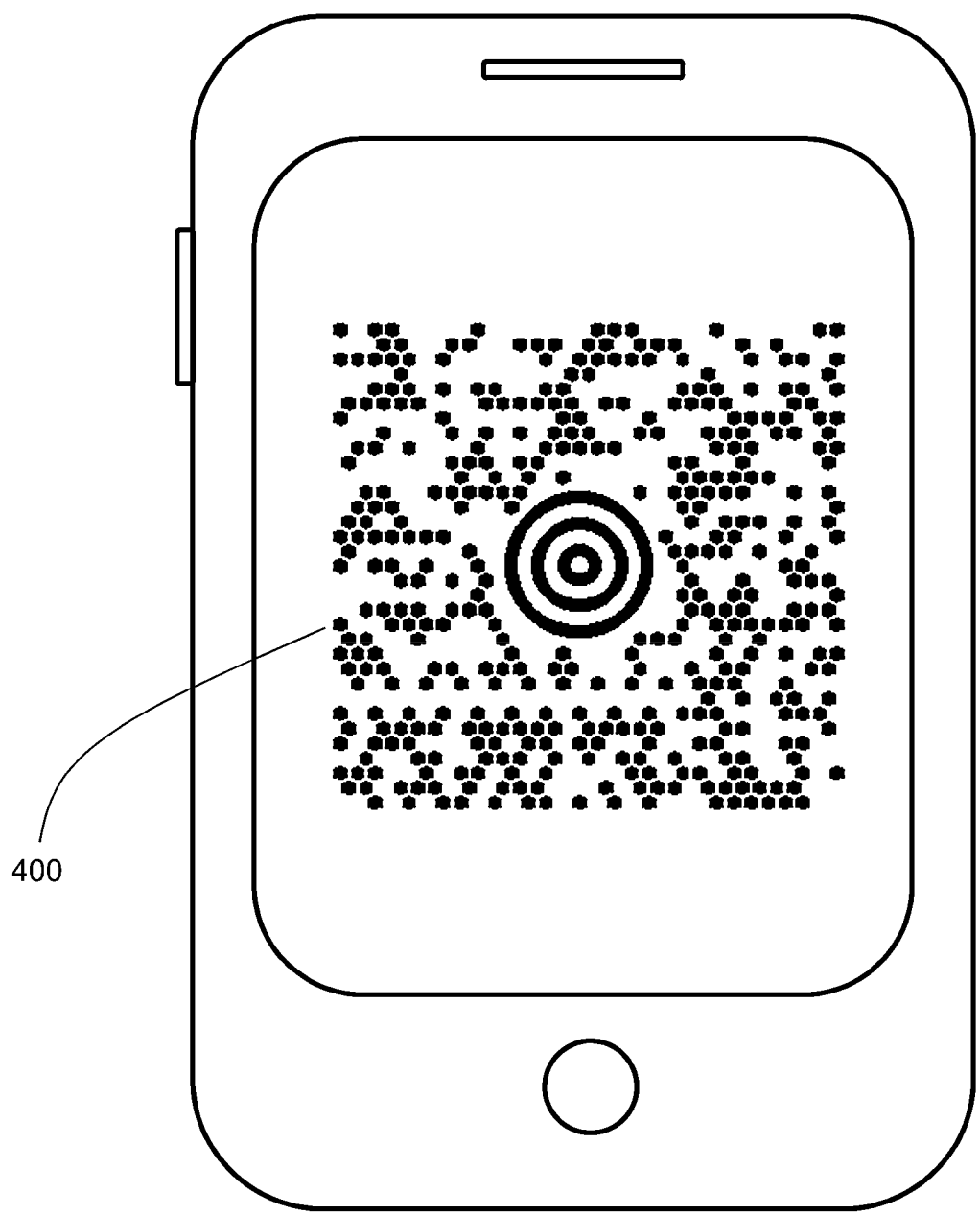
FIG. 5 illustrates a graphical representation of data including a 2D barcode.

The display 108 and receiver 110 (broadly speaking, any part of the device that conveys or senses the optical information) may be implemented using any of a wide variety of technologies that enable optical information to be formed and conveyed and received and sensed. For example, the display may be implemented using technologies including but not limited to liquid crystal displays (LCDs), Cathode Ray Tubes (CRTs) and plasma displays. The display may or may not include a light source, e.g., backlighting. If the display lacks a light source then an external light source may be utilized to enable communication. The external light source may be provided by the receiving device or some other source such as ambient light or another device. In at least one embodiment the sending device is a handheld device and the display includes a small flat panel 260 (FIG. 4) that can be placed on a planar surface 206 (FIG. 7). The optical receiver may be implemented using various technologies including but not limited to charge-coupled device (CCD) arrays and laser scanners (e.g., barcode readers). In at least one embodiment the optical receiver includes a planar surface 206 against which the flat panel display can be placed. The sending device and the receiving device can be positioned, located, and oriented so that the optical information can pass directly or indirectly along a path from one to the other. In some examples, the path includes a segment through air. For example, a display on a mobile phone can be used to send to another mobile phone which uses a camera to sense the display.

Figure 3:
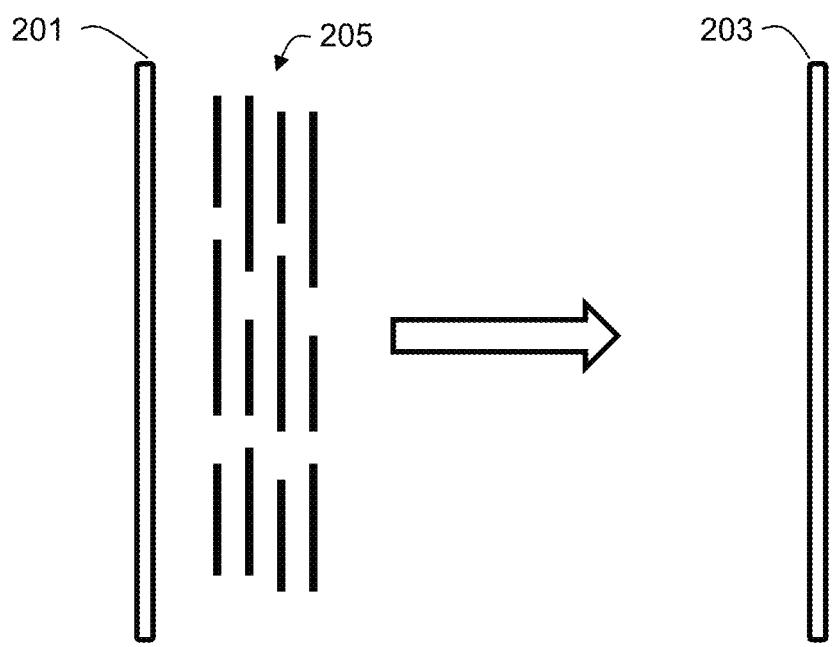
FIG. 3 illustrates an optical representation of data using modulated light.

Referring to FIGS. 1 and 3, in some cases, the optical representation 99 may include light 205 which is modulated in intensity (e.g., Li-Fi), pattern, or both to carry the data.

For example, and without limitation, light intensity of a source 201 such as a display of a cell phone may be modulated and detected using a receiver 203 such as a ccd array or barcode reader. However, use of modulated light is not limited to use with those components and devices.

Referring to FIGS. 1 and 4 through 6, in some examples, the optical representation 99 may include a graphical representation which can take any of a wide variety of forms, shapes, sizes, colors, resolutions, configurations, formats, encodings, or any combination of two or more of those, including but not limited to 1D and 2D barcodes. Specific examples include but are not limited to High Capacity Color Barcodes (HCCBs), matrix barcodes including Quick Response (QR) codes and Tags (or various combinations of two or more of those). A 1D barcode 300 is typically an optical machine-readable representation of data based on varying the widths and spacings of parallel lines. A 2D barcode 400 is typically an optical machine-readable representation of data based on a geometric pattern. For example, a HCCB is a two dimensional barcode using clusters of colored geometric shapes. A matrix barcode is a multi-dimensional barcode. A QR code 500 is a specific type of matrix barcode developed for the automotive industry. A Microsoft Tag is an implementation of HCCB using 4 colors in a 5×10 grid. The above are merely examples, and any graphical representation capable of conveying data might be used.

Referring again to FIG. 1, in some implementations, generation and reading of the optical representation 101 may be accomplished with known algorithms 121, 123 using the processing logic 106, 112. For example, and without limitation, a binary string 199 or other data format can be translated into a QR code using an open source or commercially available algorithm, and translated back into the binary string using an open source or commercially available algorithm. A receiving device may continuously scan for a communication once activated, and upon detecting a communication automatically read it, perform translation, and prompt consummation of a transaction 258 (FIG. 2). However one or more of those processes might also be made contingent on other input. Algorithms 125, 127 which respectively encrypt and decrypt the data might be used, but need not necessarily be used for all applications. Use of known algorithms may facilitate implementation, whereas new algorithms could be developed to further enhance security.

In some implementations, the context in which the communication of the optical information is done can be controlled or structured to reduce the chance of the optical information being intercepted by a device for which the communication is not intended or is to be protected. The control or structuring of the communication can be done by screening or protecting or obscuring or otherwise constraining access to the communication path of the optical information.

Referring to FIGS. 1 and 7, although some combinations of display 108 and receiver 110 may be capable of communication at one or more ranges of distance, it may be advantageous to perform communication at close range in order to enhance security. For example, the devices involved in the optical communication may be placed in close proximity or direct contact for display and reading such that the graphical representation (or other optical representation) cannot feasibly be viewed and read by a nearby (e.g., rogue) device 262 for which it is not intended. Close proximity in this sense could mean less than a meter, or less than some fraction of a meter greater than a centimeter or a centimeter or less, or a millimeter or less, for example. Although close proximity may protect the optical path of the communication, in some implementations, other techniques could be used to protect the path while permitting communication over a distance that could be as large as many meters (or even far longer distances) or as small as a centimeter or a centimeter or less, or a millimeter or less, for example.

For example, in one embodiment the receiving device 102 includes a POS terminal 200 with an optically transparent or translucent planar window 202 on which a first device 100 such as a mobile phone can be placed such that the display 108 of the mobile phone faces the window and is substantially shielded from view other than by an optical receiver 110 disposed on an opposing side of the window within an optically opaque housing 750. An optional cover 204 may be used to further shield the sending device from view. Further, placement of the sending device on the window or closing the cover may optionally be used to prompt the sending device to begin displaying the graphical representation of the data. Mirrors and lenses (one lens 752 shown) may be employed to redirect and focus the image for delivery to the optical receiver within the housing. A wide variety of other approaches and devices, and combinations of them, could be used to shield, protect, screen, or conceal the optical information being communicated.

In order to provide context and help illustrate one way in which the described devices have utility, a financial payment system 2000 operated by the service provider 105 (FIG. 1) will be described with reference to FIGS. 1, 8 and 9. In such a system, payment data (which is a form of transaction data in some cases) associated with an instrument of payment 120, which may include the number of a credit or debit card (for example, a credit card number), the name of the cardholder, the expiration date, the identity of the issuing institution, the security code, or data contained in the magnetic strip of a credit or debit card, or any other set of information can be represented optically and read by another device such as a mobile phone or point-of-sale (POS) terminal in order to cause a payment to occur. A very wide variety of payment data could be used that is, alone or with other available information, sufficient to enable a payment to be effectuated as part of a transaction. For example, any kind of account identification or payment authorization information, whether or not associated with a tangible instrument of payment, in any form, quantity, encryption, duration, or character, or any combination of two or more of those, could be part of payment data.

People or entities could be permitted to use the system described here whether or not they are registered as members to use the system. The system could be used on a one-time basis, or by subscription, for a cost or without charge, on demand, or in some cases only by pre-arrangement. Referring to FIGS. 1 and 8, in some implementations, in order to provision a new member 254 or 256 (FIG. 2) the service provider 105 determines whether the new member is a buyer, seller, or both in step 600. If the new member is a seller then the service provider qualifies the seller and obtains various basic information about the seller in step 602, including an identity of an account 603 into which payments are to be deposited. Program code including a seller App 607 and optionally algorithms 123, 127 are loaded onto the seller's device 102 (of which there may be more than one), as shown in step 604. An auxiliary hardware such as optical sensor 110 is installed if necessary. For example, an existing POS terminal may be modified to operate in accordance with the principles described herein as shown in step 606. Alternatively, a POS terminal could be installed as shown in step 606.

If the new member is a buyer 254 (FIG. 2) then the service provider 105 obtains various basic information about the buyer as indicated by step 608, including information descriptive of at least one instrument of payment 120, e.g., a bank account from which payments can be made, and credit/debit card information. Based on built-in industry established protocols, the system may categorize credit/debit cards in folders 122 such as bank cards, department store credit cards, gas company credit cards, loyalty cards, etc. The organized folders may be provided electronically to the customer for further customization based on customer's preferences. A buyer App 124 is loaded onto the buyer's device or devices 100 as indicated by step 610. The buyer App then downloads the buyer's instrument(s) of payment information in folders 122 to the buyer's device 100 as indicated by step 612, where it is stored. Security settings 612 are implemented on the buyer's device to protect the downloaded information. By including information associated with multiple instruments of payment the system helps to mitigate the need for carrying multiple physical cards in a wallet or purse, or a wallet at all.

Referring to FIGS. 1, 9, 10 and 11, in an exemplary transaction 2000 when the buyer 254 (FIG. 2) wishes to make a purchase, sale information 126 including price 126 is entered on the seller's device 102 as indicated by step 700, e.g., using keypad 1000. The buyer activates the buyer App 124 on the buyer's device 100 as indicated by step 702. Authentication based on entry of information 128 such as a PIN (e.g., using keypad 1002) or bio scan may be optionally implemented by the buyer's device before allowing the process to proceed further. For additional verification, the buyer may also specify the amount of the payment using keypad 1002 for inclusion with information 128.

In some implementations, once authentication requirements are satisfied, the buyer selects an instrument of payment from data 103 using, e.g., icons 1004, each of which represents the corresponding instrument of payment. Optionally, the system may default to a particular instrument that may be deselected by the user. The buyer then prompts the payment, such as by pressing a button 130 and placing the buyer's device 100 on or near the seller's device 102. The buyer's App 124 then generates an optical representation of payment information as described above, including the selected instrument of payment and optionally the payment amount that was entered by the user and an indication of the authentication which was performed. The optical representation is presented on the display of the buyer's device as indicated by step 704. The optical representation is read by the seller's device as indicated by step 706. The seller's device 102 may have a receive button 1006 to prompt commencement of scanning for the optical representation. The optical representation may be converted to an electrical representation and translated into the corresponding payment information by the seller App 607 as indicated by step 708.

In some examples, the payment authorization information 129 and sale information 126 (and possibly other transaction information) are transmitted to device 116 via network 117 (optionally via the service provider 105) as indicated by step 710. Optionally, the optical representation is sent to device 116 or the service provider 105 untranslated, or in a state in which some processing has been done on it, but it is not fully translated back to the original transaction information. The remaining translation and processing is then performed by device 116 or the service provider 105. The seller's device 102 may have a send button 1007 for prompting transmission of data to device 116 or the service provider 105. The service provider 105 or device 116 verifies the transaction using the indication of authentication (if any), and checks for a match between the payment amounts entered by the seller and buyer (if any). If the authentication is verified and the payment amounts match, device 116, which may be associated with a financial institution, prompts payment 132 to be made to the seller's account 603 and sends confirmation notifications 723 to both the buyer's device and seller's device as indicated by step 712. An error notification is sent to both the buyer's device and seller's device if the authentication is not verified or the payment amounts do not match. It should be noted that the service provider 105 may be a bank or other financial institution, e.g., which optionally operates or controls device 116, or a liaison between the buyer's and seller's financial institutions. Depending on the implementation, transaction information including payment information and sale information can be sent from either only the buyer's device, only the seller's device, or a combination of them. In some cases only partial transaction data could be sent from one device and other partial transaction data could be sent from another device.

As mentioned earlier, in some cases, both buying and selling capability may be implemented in the same device. In other words, a user's device can be used for both making and receiving payments. Some mobile phones and other wireless mobile devices are equipped with hardware that enables them to function as either the buyer device or the seller device or both. Consequently, the relatively simple and inexpensive procedure of downloading an App may help obviate the need to carry cash and credit/debit cards in a wallet or purse, and also allow individuals and organizations to accept instruments of payment in a way that was previously impractical.

For purposes of enabling a transaction to be effected, optical information can be sent only one way from a buyer's device to a seller's device, or only one way from a seller's device to a buyer's device, or both ways between the buyer's device and the seller's device. Also, the transaction data that is to be sent to a processing location to effect payment for the transaction may be either only from the seller's device, only from the buyer's device, or in part from each of the devices. In each case, some of the information needed for the transaction is passed as optical information from one of the devices to the other devices.

For example, referring to FIG. 12, in some embodiments a buyer's device 800 can be used to make payments when a seller's device 801 is "non-communicating," e.g., lacks network connectivity or for which network connectivity is unavailable at a given time or for some reason the network connectivity cannot or will not be used. In some cases, both devices may be non-communicating at a time when optical information about a transaction is passed between them; later, when at least one of the devices is no longer non-communicating, the transaction may be consummated or effected through a remote facility. In some instances, it may be possible to effect payment when both devices are non-communicating, if a means of payment can be used that does not require remote communication with a processing facility.

Examples of seller's devices that may be non-communicating include but are not limited to vending machines and parking meters that may not be easily or cost effectively upgradable to utilize a network to communicate with a service provider. In some implementations, in order to support performance of transactions, such non-communicating seller's devices (NCDs) 801 may be equipped with a display 804, optical receiver 802 and processing capability 806. The NCD 801 displays an optical representation of information 820 required to process the transaction. The information may include an amount and an encrypted message indicating to a device 808 controlled by a service provider or financial institution that the transaction is legitimate. The optical representation is read by a receiver 807 of the buyer's device 800. The buyer selects an instrument of payment and optionally enters authentication information and an amount of payment such as described above with regard to FIGS. 1 and 9. Transaction information 822 including one or more of the amounts indicated by the buyer's device and seller's device, selected instrument of payment, indication of authentication of user, and the encrypted message are transmitted to device 808 via a network 810 using the buyer's device 800. Device 808 verifies the transaction using both the encrypted information and the indication of authentication, and checks for a match between the amounts entered by the seller's device and buyer's device. If the authentication is verified and the payment amounts match then device 808 prompts payment to be made to the seller's account such as described above with regard to FIGS. 1 and 9. Device 808 also generates an encrypted payment authentication information 824 which is transmitted to the buyer's device 800 via the network 810. The buyer's device generates an optical representation 824' of encrypted payment authentication information 824, e.g., using a display 809. The optical representation 824' is read by the sellers' device 801 using a receiver 802, converted to an electrical representation, and decrypted. If the decrypted message indicates that device 808 prompted payment in the expected amount then device 801 prompts provision of the goods or services associated with the transaction.

A wide variety of security measures can be implemented to protect the user's sensitive data. For example, sensitive data stored on a user's device may be encrypted. Password and biometric access protections may also be used. Further, if a user's device is lost or stolen then an instruction may be sent to the device to prompt deletion of the sensitive data. For example, the user can contact the service provider or use the service provider's website to prompt data deletion and disabling of the App on the device. Security may be enhanced by using multiple layers of security, e.g., to select an instrument of payment. Further, the seller's App may prompt deletion of any sensitive data from the seller's device once the transaction is complete. Transaction details may be made available on secure pages on a website. A combination of any two or more of these and other security protection features can be applied.

In some examples, the optical representation of data can be directional or passive or both. For example, the representation can be considered directional if the representation cannot be read from all directions, for example, if the display is planar and has a narrow field of view, or for other reasons. In some instances, the representation can be considered passive because the image may be detectable or readable only by reflection of incident light from the representation. In some cases, for example, a vending machine or a parking meter, the representation could be a simple printed card or sign. However, the presentation need not be directional or passive.

While the invention has been described by way of example and in terms of the example embodiments, the invention is not limited to the disclosed embodiments. On the contrary, it is intended to cover a wide range of implementations of each of its features. Therefore, the scope of the appended claims should be accorded the broadest interpretation.

We use the term transaction data broadly to include, for example, every kind, combination, size, format, configuration, sequence, arrangement, and content of data, historical or current, that describes, refers to, or relates to a transaction, such as demographic, private, identifying, or characterizing information about one or more parties to the transaction; identity, quantity, size, model, duration, style, or other characteristics of one or more products or services involved in the transaction; price, currency, timing, payee, payor, financial instrument, financial institution, clearance information, or other characteristics of the consideration paid in the transaction; account information, identifying number, security code, and other characteristics of a credit, debit, or other card or account of any kind to be used for making the payment; and any other information associated with the transaction.

We use the term transaction broadly to include, for example, any present or future exchange of consideration between two parties, such as a purchase, sale, lease, investment, donation, pledge, or barter, or any combination of two or more of those. We sometimes use the term commercial transaction interchangeably with transaction and in some cases to mean that the transaction is one that occurs in commerce.

We use the term buyer broadly to include, for example, any party or its representative or agent who is acquiring consideration, often consideration other than money, in a transaction.

We use the term seller broadly to include, for example, any party or its representative or agent who is acquiring consideration, often financial, in a transaction.

For completeness and convenience, below we have set forth the text of the provisional application referred to at the beginning, We have also included the figure of the provisional application as FIG. 13 of this application.

Synopsis

Aspects of the invention provide short range communication by generating an optical representation of data that is presented on a display of a first device and read by a second device. The "sending" and "receiving" devices may include, but are not limited to mobile computers, PDAs, tablets, mobile phones, digital displays, cameras (e.g., CCD array) and scanners. The optical representation can be processed to yield the data.

The optical representation can take any of various forms. For example, barcodes, High Capacity Color Barcodes (HC-CBs), matrix barcodes including Quick Response (QR) codes, tags, and other forms may be used. A barcode is an optical machine-readable representation of data based on varying the widths and spacings of parallel lines (one dimensional), or using various geometric patterns (two dimensional). A HCCB is a two dimensional barcode using clusters of colored triangles instead of the square pixels traditionally associated with 2D barcodes. A matrix barcode is a multi-dimensional barcode. A QR code is a specific type of matrix barcode developed for the automotive industry. A Microsoft Tag is an implementation of HCCB using 4 colors in a 5×10 grid. Tags can also be implemented in monochrome.

Generation and reading of the optical representation may be accomplished with known algorithms. For example, and without limitation, a binary string or other data format can be translated into a QR code using an open source or commercially available algorithm, presented on a display, and read with another device using an open source or commercially available algorithm. Algorithms which also encrypt the data might be used, but need not necessary be used for all applications. For example, the devices involved in the optical communication may be placed in such close proximity for display and reading that the optical representation cannot feasibly be read by a rogue device. Such communication is advantageously more secure than RF communications, including near field communications (NFC), which are susceptible to interception by rogue devices.

The presentation of the data can be directional and passive. The presentation is directional because the display is planar and cannot be read from all directions. The presentation can be passive because the image may be detectable only by reflection of incident light. However, the presentation need not be directional or passive.

The invention may be particularly suitable for performing financial transactions. For example, data which represents a means of payment such as a credit or debit card can be represented optically and read by another device such as a mobile phone or point-of-sale (POS) reader in order to cause a payment to occur.

The invention can advantageously be implemented using existing mobile devices. For example, programs for generating and displaying the optical representation, reading the optical representation, and translating the optical representation into the original data may be implemented in applications which can be downloaded to mobile phones, PDAs, tablets and laptops, e.g., from "app stores" such as Amazon Appstore, Android and/or Apple. Although wireline connectivity could be utilized, mobile devices that are WiFi enabled or have built in wireless (3G) capability are particularly suitable for generating and presenting the image to make a payment. The widespread use and availability of "smartphones" presents the possibility that accepting payment via credit/debit card may become practical for individuals and organizations for which it is currently impractical. In other words, a mobile phone can be used instead of a POS card reader device to accept payment by credit or debit card. Further, it helps obviate the need for carrying physical cards and cash to make payments.

The second device (receiving device) may translate the optical representation into the original data. Alternatively the second device may send the optical representation or some variant of the optical representation to another device for translation.

In one embodiment the receiving device communicates directly with a server of the organization associated with the means of payment, e.g., the bank that issued the credit/debit card. In an alternative embodiment a third party (Company) may process transactions for all credit/debit cards that have been registered by a user with the Company. One advantage to this embodiment is being able to host all the users' credit/debit card information in a well organized and highly secured folder on their mobile phone, thereby reducing the need for a physical wallet. To that end, the Company may offer a free service for the users to register their loyalty cards as well. The revenue is generated from credit/debit card transactions and advertising and marketing based on collected information, and not from the sale of technology. Even though technology is an important part of the service the Company offers, it's not the main sources of revenue.

The Transaction on the Consumer/Buyer Side

The customer first registers with the Company (including acceptance of the terms of use) on its website. The customer then uploads information about their credit/debit cards. The information is associated with the customer's account on the Company's website. Based on built in industry established protocols, the system categorizes credit/debit cards in folders such as bank cards, department store credit cards, gas company credit cards, loyalty cards, etc. and offers the organized folders to the customer for further customization based on customer's preferences. Once the settings are saved, the customer downloads the Company's App from the market and signs in with the credentials already established on the Company's website. The App then downloads the customer's on-file credit/debit card information to his/her smartphone. The security settings (over and above minimum requirements of the Company) that have already been chosen by the customer will also download to the phone. The customer then proceeds to the retail location where he/she will make his/her next purchase. At the checkout counter, the customer simply opens the App, goes through the security steps (PIN's can be custom added to any of the stages by the customer) and chooses the credit/debit card he/she wants to use by tapping through the folders. Once the customer taps the election button "Use This Card" and inputs the PIN at that stage as well as the purchase price (optional; to avoid price discrepancy), a QR code (or M.S. tag) image appears on the customer's device. The image contains all the necessary information for processing a credit/debit card transaction. This information could be identical to the information presented in the magnetic strip of a conventional credit/debit card. The clerk then scans the QR code (or M.S. tag) with a scanning device (similar to barcode scanners) that is capable of extracting the necessary information and feeding it into the retailer's POS system. This info is then processed in the same manner that credit/debit card information is currently being processed and the sale is completed through either the Company's systems or the credit/debit card company's system. In the case of the latter, the credit and sales data are accompanied by a special message that identifies the transaction to the credit/debit card company as one generated by the Company's service. In either case, the Company can receive a percentage of the transaction fee charged by the credit/debit card company. The revenue stream can be almost limitless because the Company's service acts as the user's virtual wallet and the Company collects transaction (interchange) fees from all users' credit/debit cards. The service has the potential to grow worldwide as some many other countries have shown more readiness to use wireless technology for commerce than the United States).

Security

To address the ever increasing concern for security issues regarding the collection of credit data from members, the following measures are anticipated. The users will be selecting usernames and passwords to set up their online accounts on the Company's website. The downloaded information onto the users' smartphones may also be protected by at least two layers of security which are customizable by the user. The first level is encountered when the user initiates the App. The second level is encountered after a specific card is selected, but before the appropriate QR code (or M.S. tag) appears that allows the card holder's account to be charged. The customer can add additional password or security levels through the customization features on the website (or on the smartphone) which will be downloaded to the App. If a user's phone is lost, while the above mentioned security levels protect the user, the user can simply log onto the account on the website and totally disable the App. In addition, a toll free number (collect for international callers) will provide a menu to log in and disable the App when access to the website is not available or less convenient. In addition, the users' information can be protected and insured against unauthorized use with a minimal exposure to the user.

The Company will likely establish a highly secured server to hold the credit information provided by the users. Multiple layers of security, encryption and scrambling of data may also be employed to provide the users with the confidence needed to sign up for this service.

The Transaction on the Retailer/Seller Side

For merchants currently conducting credit/debit card transactions, a small enhancement to their POS system allows scanning of the QR Code (or M.S. tag) presented by the user-buyer, which triggers the transmission of the secure sales info to the Company's systems for processing. Once the QR Code (or M.S. tag) is scanned, the transmission of the credit information is the same as the conventional credit/debit card sales and can be made by the same system currently in use. No credit information is retained by the POS system.

For sellers not currently enrolled for processing credit/debit cards, the process is simple. Once registered and approved by the Company, anyone with a smartphone can process credit/debit card transactions by simply downloading the Company's App that is capable of scanning and processing QR codes (or M.S. tags) presented by the buyer using Company's App (for the buyer side), and transmitting it along with the sales information to the Company for processing. The App specifically designed for the seller will provide a mobile Point Of Sale system capable of conducting sales transactions, adding taxes, issuing refunds, etc. This process allows any smartphone to become a card reader. Small retailers, salespeople, or even individuals (P2P) who meet the Company's qualification process, can now accept and process credit/debit card transactions. The entire sales process can be carried out using smart phones which transmit the complete sales info to the Company's system via the internet or cellular network. This data is accompanied by a code generated by the App which the Company's system recognizes as verification of a legitimate transaction initiated by an authorized/approved user. Once the transaction is transmitted, the buyer's info is removed from the seller's QR (or M.S. tag) reader. The buyer and the seller will both receive confirmation e-mails, and/or text messages containing only the pertinent transaction information. They will also be able to review all their transactions on their secure pages on the Company's website organized by card, date or any other criteria they choose. This convenience for small businessmen and retailers encourages the use of the Company's App/system and is an incentive for the major credit/debit card companies to partner with the Company to capture the additional sales transactions that have historically been conducted through exchange of cash and/or checks. This additional capability which competes with cash and payment by check provides added incentives for the credit card companies to partner with the Company.

What is claimed is:

1. A method comprising:
enabling a first device (a) to receive information from a second device that is not connected to a communication network, the information carrying data that identifies one or more items being sold from the second device to the user of the first device, (b) to cause payment for the one or more items to be authorized at a remote location, and (c) to send to the second device information confirming the payment.

2. The method of claim 1 in which enabling the first device to send information confirming the payment comprises enabling a mobile telephone to communicate the information using radio frequency signals.

3. The method of claim 1 wherein enabling the first device to send information confirming the payment includes enabling the first device to optically communicate a barcode.

4. The method of claim 1 wherein enabling the first device to receive information includes enabling the first device to optically read printed material.

5. The method of claim 1 wherein enabling the first device to send information confirming the payment includes enabling the first device to electronically display information.

6. The method of claim 1 in which carrying data that identifies one or more items being sold comprises carrying data that identifies consumable consumer items.

7. The method of claim 1 in which carrying data that identifies one or more items being sold comprises carrying data that identifies services.

8. The method of claim 1 in which enabling the first device to receive information from the second device includes enabling the first device to receive information from a vending machine.

9. The method of claim 1 in which enabling the first device to receive information from the second device includes enabling the first device to receive information from a parking meter.

10. A computer program on a non-transitory computer-readable medium comprising:
logic enabling a first device (a) to receive information from a second device that is not connected to a communication network, the information carrying data that identifies one or more items being sold from the second device to the user of the first device, (b) to cause payment for the one or more items to be authorized at a remote location, and (c) to send to the second device information confirming the payment.

11. The computer program of claim 10 in which the first device comprises a mobile telephone which communicates the information using radio frequency signals.

12. The computer program of claim 10 in which the information confirming the payment comprises a barcode which is optically communicated.

13. The computer program of claim 10 in which the information carrying data that identifies one or more items being sold comprises printed material which is optically communicated.

14. The computer program of claim 10 in which the information confirming the payment comprises electronically displayed information.

15. The computer program of claim 10 in which the items being sold comprise consumable consumer items.

16. The computer program of claim 10 in which the items being sold comprise services.

17. The computer program of claim 10 in which the second device comprises a vending machine.

18. The computer program of claim 10 in which the second device comprises a parking meter.

19. Apparatus comprising:
a first device enabled (a) to receive information from a second device that is not connected to a communication network, the information carrying data that identifies one or more items being sold from the second device to the user of the first device, (b) to cause payment for the one or more items to be authorized at a remote location, and (c) to send to the second device information confirming the payment.

20. The apparatus of claim 19 in which the first device comprises a mobile wireless device which communicates the information using radio frequency signals.

21. The apparatus of claim 19 in which the information confirming the payment comprises a barcode which is optically communicated.

22. The apparatus of claim 19 in which the information carrying data that identifies one or more items being sold comprises printed material which is optically communicated.

23. The apparatus of claim 19 in which the information confirming the payment comprises electronically displayed information.

24. The apparatus of claim 19 in which the items being sold comprise consumable consumer items.

25. The apparatus of claim 19 in which the items being sold comprise services.

26. The apparatus of claim 19 in which the second device comprises a vending machine.

27. The apparatus of claim 19 in which the second device comprises a parking meter.

28. A method comprising:
performing a transaction with a first device to a second device, where the first device lacks network access, comprising:
the first device generating a representation of data;
detecting the representation using the second device;
the second device providing the data and information associated with an instrument of payment to a third device;
the third device providing an indication of payment verification to the second device; and
the second device providing the indication of payment verification to the first device,
wherein at least one of the first and second devices comprises a mobile wireless device.

29. The method of claim 28 including encrypting the information associated with an instrument of payment provided to the third device.

30. The method of claim 28 including encrypting the indication of payment verification provided to the second device.

31. Computer program code stored in non-transitory computer-readable memory comprising:
logic for performing a transaction with a first device and a second device, where the first device lacks network access, comprising:
logic of the first device generating a representation of data including an indication of transaction legitimacy;
logic detecting the representation using the second device;
logic of the second device providing the data and information associated with an instrument of payment to a third device;
logic of the third device providing an indication of payment verification to the second device; and
logic of the second device providing the indication of payment verification to the first device,
wherein at least one of the first and second devices comprises a mobile wireless device.

32. The program code of claim 31 wherein the information associated with an instrument of payment provided to the third device is encrypted.

33. The program code of claim 31 wherein the indication of payment verification provided to the second device is encrypted.

34. Apparatus comprising:
a first device which generates a representation of data including an indication of transaction legitimacy and presents the representation;
a second device which detects the representation and transmits the data and information associated with an instrument of payment;
a third device which receives the information associated with an instrument of payment from the second device and provides an indication of payment verification to the second device; and
the second device providing the indication of payment verification to the first device, where the first device lacks network access,
wherein at least one of the first and second devices comprises a mobile wireless device.

35. The apparatus of claim 34 wherein the information associated with an instrument of payment provided by the second device is encrypted.

36. The apparatus of claim 34 wherein the indication of payment verification provided to the second device is encrypted.

37. A method comprising
enabling a mobile device, which is in the vicinity of a vending device, to permit the vending device to confirm indirectly with a payment processor, a payment from an account of a holder of the mobile device for an item or service being sold from the passive vending device to the holder, without the vending device confirming the payment directly with the payment processor,
the mobile device sensing an identity of the item or service and its price as provided by the vending device, executing the payment from the account, and providing an authentication indication to the vending device that the payment has been executed.

* * * * *